United States Patent [19]
Bhattacharyya et al.

[11] Patent Number: 5,351,287
[45] Date of Patent: Sep. 27, 1994

[54] METHOD AND APPARATUS FOR DATA EVIDENCE COLLECTION

[75] Inventors: Ranendra K. Bhattacharyya, Monmouth Junction, Middlesex County; Timothy C. Feustel, Cedar Knolls, Morris County; Henry M. Kluepfel, Mendham, Morris County, all of N.J.

[73] Assignee: Bell Communications Research, Inc., Livingston, N.J.

[21] Appl. No.: 988,987

[22] Filed: Dec. 11, 1992

[51] Int. Cl.$^5$ .............................................. H04M 1/66
[52] U.S. Cl. .................................... 379/95; 379/35; 379/188; 379/189
[58] Field of Search .................... 379/34, 35, 188, 189, 379/95, 93

[56] References Cited
U.S. PATENT DOCUMENTS

| | | | |
|---|---|---|---|
| 3,704,348 | 11/1972 | McIntosh et al. | 379/35 |
| 4,531,023 | 7/1985 | Levine | 179/2 |
| 4,712,230 | 12/1987 | Rice et al. | 379/112 |
| 4,815,120 | 3/1989 | Kosich | 379/35 |
| 4,831,648 | 5/1989 | Nishino | 379/95 |
| 4,924,488 | 5/1990 | Kosich | 379/34 |
| 4,937,862 | 6/1990 | Kosich | 379/34 |

FOREIGN PATENT DOCUMENTS 4117051 4/1992 Japan ........................................ 379/34

Primary Examiner—James L. Dwyer
Assistant Examiner—Daniel S. Hunter
Attorney, Agent, or Firm—Leonard Charles Suchyta; Joseph Giordano

[57] ABSTRACT

A dialed number recorder, a data monitor, and a personal computer are connected in combination to monitor the data traffic on a suspect "hacker's" telephone line. At the beginning of a call, the dialed number recorder receives and interprets the DTMF signals detected on the line and translates the DTMF signals into the corresponding telephone number dialed. The data monitor receives all signals on the line and converts them into their corresponding characters and transmits these characters, to the personal computer where the characters are stored in a buffer in dynamic memory. The personal computer compares the received data stream against a set of known characters strings looking for a match. If an on-hook signal (indicating the end of the call) is received without a match, the data stored in dynamic memory thus far is erased. If any series of sequential characters matches one of the known strings, the buffered data is written to the computer's disk. In addition, the personal computer collects the call record information from the dialed number recorder and appends this information to the data file.

15 Claims, 4 Drawing Sheets

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Usage of this machine is restricted to authorized Bellcore business purposes only and is subject to audit. Unauthorized usage is subject to prosecution. If you hve any problems or questions, please send email to:

"email address"

METHOD AND APPARATUS FOR DATA EVIDENCE COLLECTION

TECHNICAL FIELD OF THE INVENTION

This invention relates to a method and apparatus for collecting evidence of unauthorized access to a host computer by a user using the public switched telephone network. Specifically, the evidence collected using the method and apparatus herein disclosed would be collected according to court established guidelines of reasonableness, sufficient cause and property rights protection of a carrier or party to a communication.

BACKGROUND OF THE INVENTION

The privacy of parties to electronic communication sessions is protected by federal law, regulation and most state law. However, under the provisions of the Electronic Communication Privacy Act of 1986, electronic communications service providers are permitted to monitor the contents of data communication sessions, to which they are a party, to protect their property rights. According to these provisions whenever communications from a specific telephone line are suspected to be engaged in illegal and unauthorized activities commonly known as "hacking" which threaten the property of the service providers, the service providers are authorized to monitor the communications and collect evidence of the unauthorized activities. However, data collected under such circumstances that are intended to be used as evidence in subsequent criminal prosecutions must be based on court established standards of reasonableness. Thus, the collection of data on threatening activities cannot be arbitrary, and indiscriminate, and should only be based on the detection of telltale signs that the provider's host computer systems are being accessed without authorization and their property rights are indeed being violated.

Fraud on the property rights of the service providers is not new. A past example was the activity known as "blue box" toll fraud. In this type of activity a telephone subscriber intent on defrauding the telephone service providers would make a toll free telephone call and then send a single 2600 Hz tone on the telephone line causing the switching equipment to release the connection but allow the caller to originate another call for which no billing would be rendered. Because the 2600 Hz tone for the duration and signal strength to cause such a release back would not normally occur on a subscriber's line, the presence of such a tone was construed as probable cause for further investigation and recording activity on the line. In order to combat such toll fraud, Dialed Number Recorders (DNRs) were developed to monitor for the presence of inband signaling indicative of this type of fraud. The DNR would record the new called address and record the progress of a call whenever a 2600 Hz tone of sufficient signal strength and duration was encountered. When monitoring is restricted in this fashion, the courts have held that the information collected does not violate an individual's privacy rights and is admissible as evidence in criminal proceedings.

The situation with regard to data communications fraud is more difficult. Although it is relatively easy to monitor modem-based data communications using commercially available equipment, it is not easy to see how such data can be selectively collected to meet the reasonableness and probable cause requirements for evidentiary purposes. The information collected using data monitors currently in the art could not be used without a court order because there has not been any way to restrict recording of communications activity to those sessions or calls that could be reasonably construed as threatening. Indeed, monitoring communications sessions without adhering to the reasonableness requirements indicated above can open a communications carrier to liability to their users. Compounding the problem, unlike the blue box fraud described above, the indication of a possible threatening or fraudulent communication is not always at the beginning of the communications session. Many times the determination that a threatening call is in progress cannot be made until later in the call whereas the important evidence for property rights protection are those activities during the session prior to the determination. Therefore, there is a need to non-intrusively monitor a suspect telephone line, record only those calls that are deemed threatening, and to capture and record the entire call even if the determination that the session is threatening is made later in the call.

In attempting to obtain evidence of possible improper communication from a suspected intruder, the security people involved are aware of the possible intruder's telephone line. What is needed is also to become aware that the intruder, using their terminal or other equipment connected to their line, is attempting to gain access to equipment within the communications network for which he does not have authorization. If one could determine from the access codes or dialed numbers emanating from the suspected intruder's terminal equipment that such access is being attempted, the problem would be quite simple to resolve. Unfortunately, the dialed numbers appearing on the potential intruder's line do not necessarily indicate the ultimate destination sought.

There may be a number of reasons why the dialed numbers will not identify a threatened destination point or system. One reason is that potential intruders do not usually directly address their destination but will approach it indirectly, by proceeding through a number of intermediate systems or locations using a technique commonly known as weaving. Thus the number dialed appearing on the suspect's line may be that of a computer system to which the suspect may properly have authority to access but which is not the ultimate system destination. Another reason is that in accessing packet networks, the access signals or dial signals first appearing on the intruder's line would be merely the identification of the packet network and not of the ultimate destination sought.

Therefore, it is the primary objective of the present invention to collect evidence of communication to a service provider's host computer that threatens to violate the service provider's property rights. It is an additional objective of the present invention to collect evidence of such activities that would be admissible in court. In order to achieve these objectives it is a further objective of the present invention to identify only those communication sessions or calls which are deemed threatening. It is a further objective of the present invention to be able to develop a record of the entire communication session or call even if the determination that the call is threatening or that the determination that the communications provider is a party to the call isn't made until late in the communications session without ever recording in non-volatile media the contents of the session until such a determination is made.

SUMMARY OF THE INVENTION

In accordance with our invention, a dialed number recorder, a data monitor, and a personal computer are connected in combination to non-intrusively monitor the data traffic on a suspected "hacker's" telephone line. A high impedance bridge, which may be built within the data monitor, is used to bridge onto the suspect's telephone line which allows the data monitor and the dialed number recorder non-intrusive access to all signals transmitted on the telephone line. Upon detection of an off-hook signal, the dialed number recorder detects and interprets the Dual Tone Multi-Frequency (DTMF) signals on the line and translates the DTMF signals into the corresponding telephone number. The data monitor detects all data signals on the line and converts them into their corresponding characters and forwards these character to, a personal computer where the characters are stored in a buffer in dynamic memory. The personal computer compares the received data stream against a set of known characters strings looking for a match. If an on-hook signal (indicating the end of the call) is received without a match, the data stored in dynamic memory thus far, is erased. If a match is found, the buffered data are encrypted and written to the computer's disk. In addition, the personal computer collects the call record information from the dialed number recorder and appends this information to the information written to the disk.

By our invention, information appearing on the potential intruder's line after the initiation of the call is detected, captured and utilized to determine whether the content of the call is demonstrably threatening to the privacy or security of other equipment connected to the communications network. The detected warnings may come, not from the intruder, but from the accessed equipment. If no warning information is detected before the call is terminated, the communication session is not intercepted, retained, disclosed, or accessed per se within the apparatus of our invention within the normal course of business of the electronic communications service provider.

BRIEF DESCRIPTION OF THE DRAWINGS

FIG. 2 illustrates a warning banner.

DETAILED DESCRIPTION

Our invention is a method and apparatus to help electronic communication service providers combat the growing threat from intruders. The purpose of the invention is to record only those data communication sessions that contain character sequences known to identify an unauthorized access to a restricted access computer. Data sessions that do not contain such sequences are ignored, and the information transmitted during these ignored sessions is never disclosed.

Figure 1:
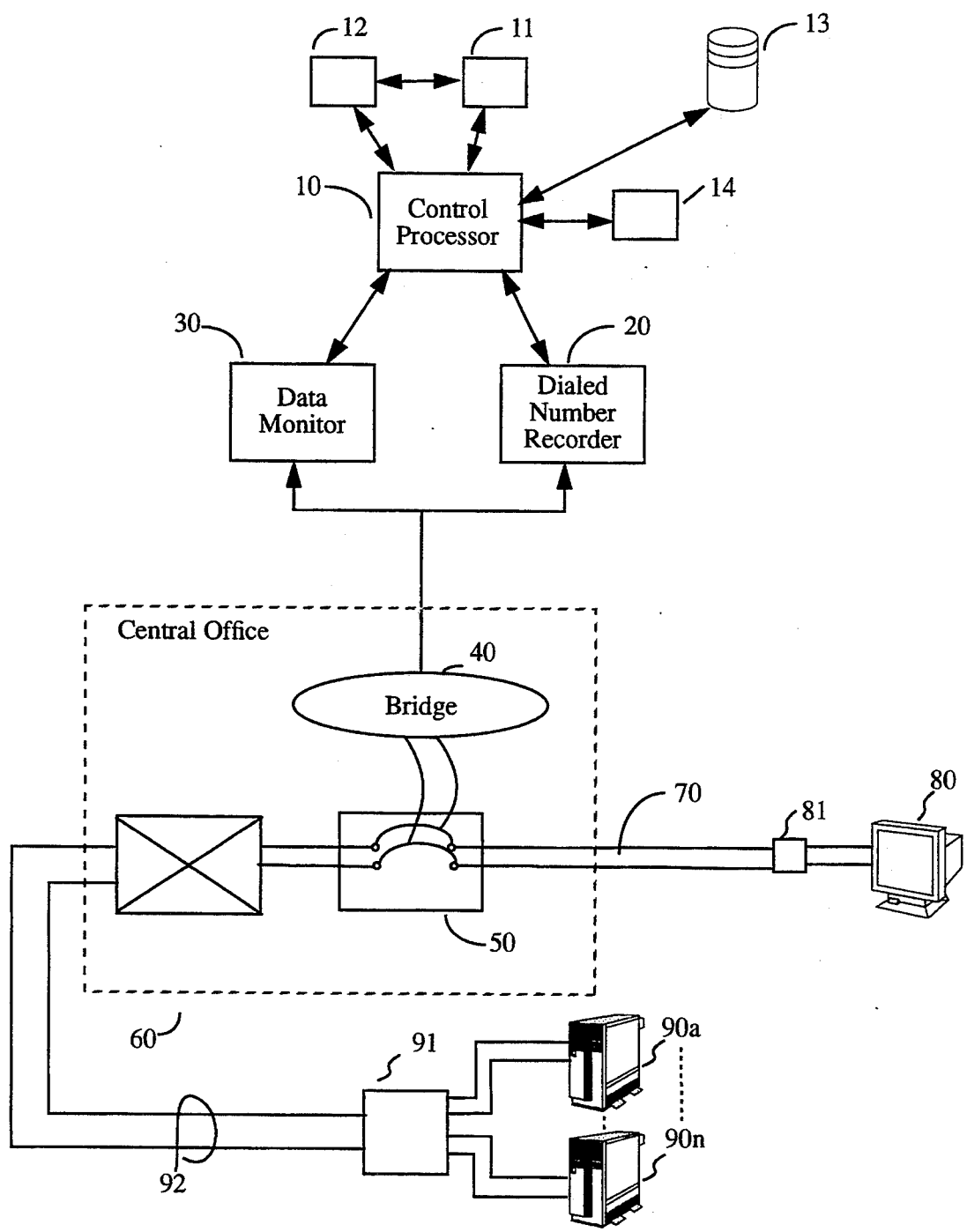
FIG. 1 depicts an illustrative embodiment of our inventive apparatus.

FIG. 1 depicts one illustrative embodiment of our inventive apparatus. It is comprised of a control processor 10, dialed number recorder 20, a data monitor 30, and a high impedance bridge 40. The high impedance bridge 40 is placed at the main distribution frame 50 in the telecommunication central office 60 to monitor all activities and data traffic on the suspected intruder's subscriber line 70 to which is connected the hacker's computer terminal 80 through a modem 81. The high impedance bridge 40 allows both the dialed number recorder 20 and the data monitor 30 access to the signals on the suspect's subscriber line 70. The dialed number recorder 20 at the receipt of an off-hook signal from the high-impedance bridge 40 records the number dialed by the subscriber.

The number dialed by the suspected intruder may be to provide access to any one of a number of computer systems 90a–90n belonging to the service provider. As shown in FIG. 1, these computers are connected through a modem 91 and leads 92 to the central office 60. It is to be understood that the accessed host computer system may be otherwise situated in the public communication network and not directly connected to the same central office as the suspect intruder. Alternatively, the suspect intruder may be attempting to gain access to a network element within the central office 60 or other communication equipment provided by the service providers within the telecommunications network.

The data monitor 30, begins to receive from the high impedance bridge 40 all signals transmitted on the telephone line and converts these signals into their corresponding ascii characters. These characters are then transmitted to the control processor 10 where they are stored in the control processor's buffer 11 within. Concurrently, the control processor's monitoring or analysis process 12 is non-intrusively examining all ascii characters received to determine if any string of these characters matches a known data string that identifies which host computer the caller accessed. Illustratively, the ascii string could be the warning banner returned from the host computer upon login by a user. FIG. 2 illustrates a sample warning banner.

Once the monitoring process 12 finds a match, the call is deemed a possible unauthorized call. Upon the determination that the call is possibly unauthorized, the control processor 10 then requests from the dialed number recorder 20, the number originally dialed by the user along with the date and time of the call. The control processor 20 writes to non-volatile memory 13 all the data stored in the processor's buffer 11 from the beginning of the call, all subsequent data received by the control processor 10 from the data monitor 30, and the information requested from the dialed number recorder 20. Optionally, the control processor 10 could encrypt the data using encryption means 14 before writing it to non-volatile memory to further protect the information from disclosure. If on the other hand an on-hook is detected signifying the end of the call before the analysis process 12 ever detects an indication that the call is threatening, all the data and information thus far stored in the control processor's buffer 11 is erased by the control processor 10.

In an alternative embodiment of our inventive apparatus, instead of using the detection of a warning banner alone as an indication of a possible threatening call, the packet network addresses of the service provider's host computers are used, with or without detection of the warning banner as indication of a threatening call. In this embodiment, the monitoring process is initialized with a set of known strings that identify the addresses on a packet network of the service providers' host computers. The appearane of one of these addresses on the intruder's line is an indiction that the electronic service providers equipment is being accessed.

Figure 3:
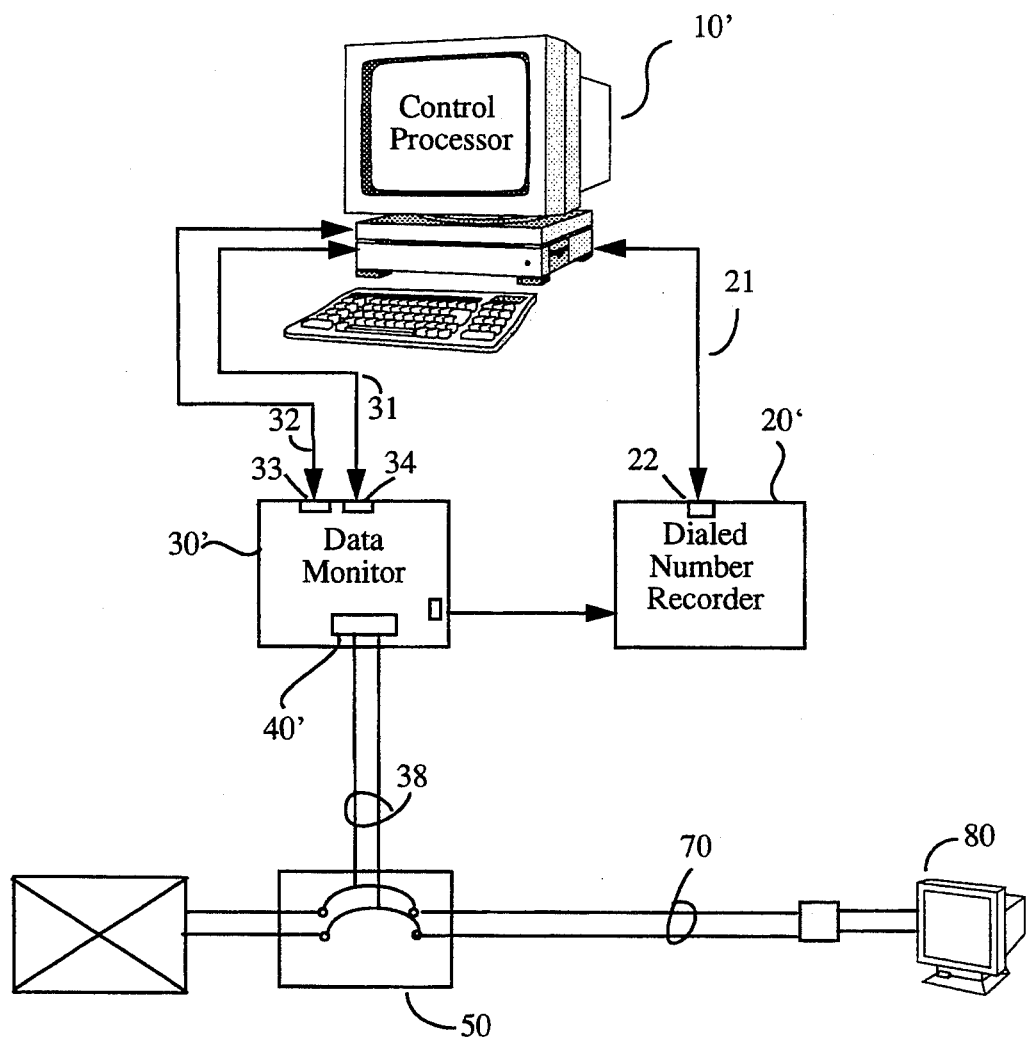
FIG. 3 depicts another illustrative embodiment of our invention using known components.

FIG. 3 depicts another illustrative embodiment of our invention. A Compaq 386 personal computer model 25e running a "C" program is our control processor 10' and includes input and display terminal. It is connected to an HDS Inc. DMS 212 data monitor 30' via serial connections 31 and 32 and RS232 interfaces 33 and 34. A JSI Telecom J-1033C dialed number recorder 20' is connected to the Compaq computer 10' via another serial connection 21 via RS232 port 22. The DMS 212 data monitor 30' contains a high impedance bridge 40' which can be used to bridge the suspect telephone line 70 at the main distribution frame 50 via leads 38. The DMS 212 also provides a RJ-11 port 35 as another access port to the high impedance bridge and to which the JSI Telecom dialed number recorder is connected via leads 23.

Our inventive apparatus includes a C program running in the Compaq Computer 10' under the UNIX ® operating system. The program communicates, via RS-232 serial communications interfaces over leads 31 and 21 to the DMS 212 data monitor 30' and over connection 21 to the JSI Telecom dialed number recorder 20'. The program is initiated by the user on the Compaq Computer 10' by specifying a unique session name. The session name is used as a file prefix for all output generated. In addition to the session name the user may choose to activate a time-stamping capability, an encryption capability, or a call logging facility. The call logging facility creates a file with summary information on all the calls for which a monitored string was found. The encryption capability was described above. The time-stamping capability is described below. The program will then query the user to enter the strings that will comprise the basis of the search. The strings are saved in a parameter file named with the session name previously specified. Subsequent invocations of the program specifying the same session name will read this parameter file, obviating the need to reenter the strings. The parameter file also contains the number of data files that have been collected to date. This number is incremented every time a file is saved, and is used as a suffix for the file to distinguish it from the other files collected using the same search strings. The program will continue to run until it is either terminated by the user, runs out of disk space for storing files, or the number of files exceeds the system maximum.

The search algorithm uses a state transition matrix to determine if a target string is matched. One of the characteristics of the matrix is that there are 128 potential transitions for each character in the search string(s). Thus, the memory requirement for the matrix expands rapidly with increasing characters in the search string. Memory available on the personal computer therefore limits the total number of characters that can be searched. The alternative address search algoritm is a simple binary search therefore using significantly less memory.

Digital time-stamping is a relatively new capability and is the subject of U.S. Pat. Nos. 5,136,646 and 5,136,647. The capability is intended to provide a means to demonstrate that a digitally recorded document has not been altered, tampered with, or otherwise compromised after the time at which it was submitted to the time-stamping service. In cases where digitally recorded information is crucial to a successful prosecution of a case, digital time-stamping can be valuable in helping to secure the chain of evidence. In the past, with analog recordings and paper documents, the integrity of evidence was protected by the intimate association between the recorded data and the recording medium. Attempts to alter or forge such evidence are easier to detect on analog tape or paper. Of course, digital documents are easy to alter and, consequently, relatively easy to repudiate.

Time-stamping overcomes this limitation of digital media. When the time-stamp utility is activated, each collected data file is first encoded into a unique string of digits known as a hash. These hashes can be produced by any of a number of public-domain algorithms. These algorithms have the common property that it is very difficult to find two documents that, when hashed, yield the same hash value. The hash produced by our invention is then automatically downloaded to a time-stamping server which applies a date to the hash and embeds it in a string of similarly produced hashes. The resultant value is saved and periodically published in the public domain. At a later time, if the integrity of the document is questioned, it can be demonstrated to have been unaltered since the time-stamped date by showing that it can be hashed to produce the same hash value as before. If anything about the document has been altered, the resultant hash value will be different than the one submitted to the service. The time stamping means can be combined with the computer 10' in FIG. 3 or can be a separate means shown as item 15 in FIG. 1.

Figure 4:
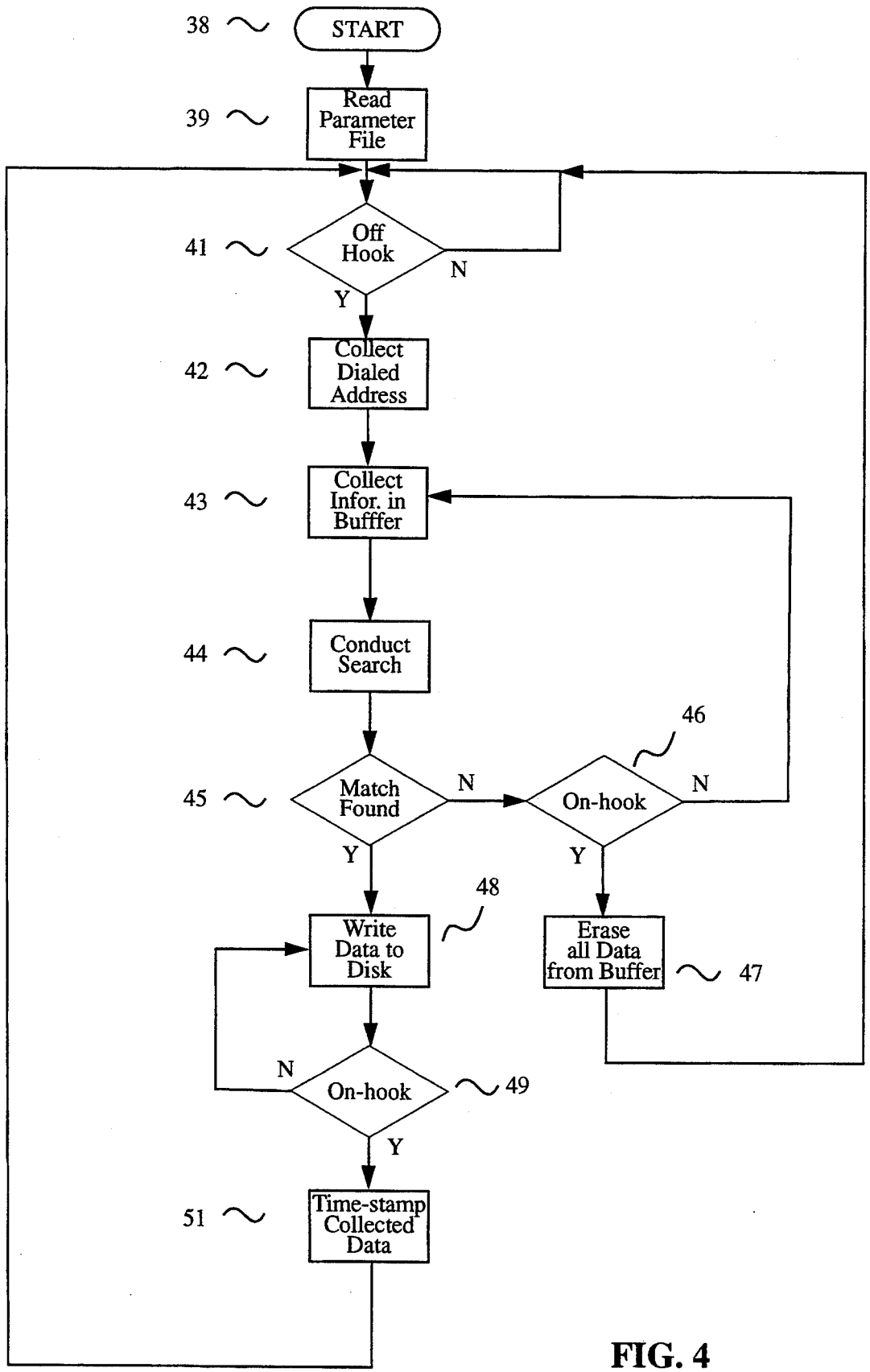
FIG. 4 is a flow diagram depicting our inventive process.

Our inventive method is illustrated in the flow chart depicted in FIG. 4. In the beginning, the software reads the parameter file to initialize the system 39. Initialization includes loading the system with the character strings or addresses that will be the basis for conducting the search. Once the system is initialized, the suspect's telephone line is monitored for an off hook 41. If an off-hook is detected our inventive method next captures the number dialed 42. Our method then records in a buffer, or some other form a volatile memory, all the information being transmitted on the telephone line 43. A search is conducted 44 on the information in the buffer looking for one of the known warning banners that would be returned by the service provider's host computer. The search 44 could also be conducted looking for one of the known host addresses. In either case, until a match is found or until an on-hook is detected 46, the information transmitted on the telephone line is continuously collected the buffer 43. If a match is found 45, then all the data from the buffer 43 and the captured number dialed 42 is written to disk or some other form of non-volatile memory 48. If on the other hand an on-hook was detected 46 before a match was found then all the information in the buffer is erased 47 and the system then returns to monitoring for an off-hook 41. Once a match is found, our method continues to write to non-volatile memory (in either encrypted or non-encrypted format) the information transmitted on the telephone line and then the system continues to monitor for an on-hook 49. Once an on-hook is detected 49, the system then can time-stamp the collected data 51; time stamping is an option. The system then returns to monitoring the telephone line for an off-hook 41 and the method is repeated.

It is to be understood that the method and apparatus for data evidence collection illustrated herein are not limited to the specific forms disclosed and illustrated, but many assume other embodiments limited only by the scope of the appended claims. For example, it is an embodiment of our invention to combine a protocol analyzer and a computer to monitor a purely digital telephone subscriber line. It is in accordance with our invention to bridge the digital subscriber line, decode the digital bit stream using the protocol analyzer and send the characters received to the computer where the character stream is stored in a buffer in dynamic memory. The computer searches the received character bit stream for a match with one of a set of known bit streams looking for a match. If a match is found all the information in the buffer including all subsequent characters received is written to disk or some other form a non-volatile memory. This continues until a call termination message is received. If a call termination message is detected on the subscriber's line before a match is found, then the information in buffer is erased and no record of the call is kept.

We claim:

1. An apparatus for collecting evidence of unauthorized access to equipment connected to the telecommunications network from a telephone subscriber line suspected of being a possible source of calls resulting in unauthorized access, said apparatus comprising:

a high-impedance bridge coupled to the suspect telephone line for unobtrusively tapping all signals on the suspect telephone subscriber line;

a data monitor connected to said high-impedance bridge for receiving said signals and for converting said signals into a stream of characters;

a buffer memory, an analysis processor, a control processor connected to said data monitor for receiving said stream of characters and for routing said stream of characters to said buffer memory for capturing all data traffic on the suspect telephone line and to said analysis processor for finding a match between strings of data in said buffer memory and known data strings; and a non-volatile memory into which said control processor writes all data from said buffer memory into a call record when said analysis processor finds a match between strings of data in said buffer memory and said known strings of data.

2. The apparatus of claim 1 further comprising:
a dialed number recorder connected to said high impedance bridge for receiving DTMF signals and translating said DTMF signals into the dialed number.

3. The apparatus of claim 1 further comprising:
means for digital time stamping said call record written to said non-volatile memory.

4. The apparatus of claim 1 further comprising
means for encrypting said call record as it is written to said non-volatile memory.

5. The apparatus of claim 1 wherein said non-volatile memory is a hard-disk drive.

6. A method for operating a data processing system for collecting evidence of unauthorized access to a host computer system from a telephone line suspected of being a possible source of calls resulting in unauthorized access, comprising the steps, executed in real time of:

monitoring the telephone line for a signal indicating the beginning of a call;

capturing in volatile memory all data traffic on the telephone line for said call;

analyzing the data traffic for content that identifies said call as an unauthorized access to said host computer;

writing to non-volatile memory a file containing said captured data traffic and all subsequent data traffic upon determination during said analyzing step that said call has accessed said host computer; and erasing from said volatile memory said captured data upon the detection of the end of the call occurring before identification of said call as an unauthorized access.

7. The method of claim 6 further comprising the steps of;

detecting the number dialed on said subscriber line;
recording said detected dialed number;
recording the date and time of the call; and
appending said dialed number information and said date and time of the call information to said file written in non-volatile memory.

8. The method of claim 6 wherein said analyzing step comprises: examining the data traffic for ascii character strings that match a known warning banner that is transmitted from said host computer upon access.

9. The method of claim 6 wherein said analyzing step comprises:

examining all data traffic for character strings that match one of a known set of character strings that identify an address of any computer of the host computer systems.

10. The method of claim 7 further comprising the step of time-stamping said file written in said non-volatile memory.

11. The method of claim 7 further comprising the step of encrypting said file written in said non-volatile memory.

12. The method of claim 8 further comprising the step of time-stamping said file written in said non-volatile memory.

13. A method of collecting evidence of unauthorized access from a potential intruder's line to equipment connected to the telecommunication network comprising the steps, executed in real time, of:

monitoring all signals appearing on the subscriber's line on initiation and during a communication session established by the intruder;

storing in a store said monitored signals and information identifying the communication session;

responsive to said monitoring step comparing said monitored signals known to indentify equipment to which the intruder does not have legitimate access;

detecting the end of a communication session; and deleting from the store the priorly stored information on detection of the end of a communication session before the identification of equipment to which the intruder does not have legitimate access.

14. The method in accordance with claim 13 wherein said responsive step comprises comparing signals monitored in said monitoring step to a known warning banner that is returned from equipment upon access.

15. The method in accordance with claim 13 wherein said responsive step comprises decoding any packet messages monitored in said monitoring step and comparing any packet addresses determined in said decoding step known packet addresses of equipment to which the intruder does not have legitimate access privileges.

* * * * *